(12) United States Patent
Miller et al.

(10) Patent No.: US 8,719,540 B1
(45) Date of Patent: May 6, 2014

(54) FRACTAL LAYOUT OF DATA BLOCKS ACROSS MULTIPLE DEVICES

(75) Inventors: Ethan Miller, Santa Cruz, CA (US);
John Colgrove, Los Altos, CA (US);
John Hayes, Mountain View, CA (US);
Cary Sandvig, Palo Alto, CA (US)

(73) Assignee: Pure Storage, Inc., Mountain View, CA (US)

( * ) Notice: Subject to any disclaimer, the term of this patent is extended or adjusted under 35 U.S.C. 154(b) by 190 days.

(21) Appl. No.: 13/421,336

(22) Filed: Mar. 15, 2012

(51) Int. Cl.
*G06F 12/00* (2006.01)
*G06F 13/00* (2006.01)

(52) U.S. Cl.
USPC ............ 711/173; 711/202; 711/203; 711/217

(58) Field of Classification Search
USPC .................................. 711/173, 202, 203, 217
See application file for complete search history.

(56) References Cited

U.S. PATENT DOCUMENTS

| | | | |
|---|---|---|---|
| 5,890,204 A | 3/1999 | Ofer et al. | |
| 5,951,687 A | 9/1999 | Chan et al. | |
| 6,347,366 B1 | 2/2002 | Cousins | |
| 6,377,939 B1 | 4/2002 | Young | |
| 6,519,679 B2 | 2/2003 | Devireddy et al. | |
| 6,538,669 B1 | 3/2003 | Lagueux, Jr. et al. | |
| 6,542,972 B2 | 4/2003 | Ignatius et al. | |
| 6,629,158 B1 | 9/2003 | Brant et al. | |
| 6,654,797 B1 | 11/2003 | Kamper | |
| 6,751,739 B1 | 6/2004 | Verdun | |
| 7,017,023 B1 | 3/2006 | Knight | |
| 7,069,410 B2 | 6/2006 | McBrearty et al. | |
| 7,275,142 B1 | 9/2007 | Schultz et al. | |
| 7,293,237 B1 | 11/2007 | Knight et al. | |
| 2002/0128815 A1 | 9/2002 | Merchant et al. | |
| 2002/0129216 A1 | 9/2002 | Collins | |
| 2002/0198888 A1 | 12/2002 | Young | |
| 2003/0033398 A1 | 2/2003 | Carlson et al. | |
| 2003/0046270 A1 | 3/2003 | Leung et al. | |
| 2003/0074235 A1 | 4/2003 | Gregory | |
| 2003/0076349 A1 | 4/2003 | Slaby | |
| 2005/0015407 A1 | 1/2005 | Nguyen et al. | |
| 2006/0006905 A1 | 1/2006 | Chou et al. | |

OTHER PUBLICATIONS

"Performance and Capacity Planning Solutions;" Compaq Computer Corporation, May 1999, retrieved from <ftp://ftp.hp.com/%2F/pub/alphaserver/archive/DECinfo/info_3/infosheet/Performance_and_Capacity_Plann_14may1999LIW0LXPF.pdf> on Jun. 4, 2013; pp. 1-4.

*Primary Examiner* — Midys Rojas
(74) *Attorney, Agent, or Firm* — Rory D. Rankin; Meyertons, Hood, Kivlin, Kowert & Goetzel, P.C.

(57) ABSTRACT

A system, method, and computer-readable storage medium for mapping block numbers within a region to physical locations within a storage system. Block numbers are mapped within a region according to a fractal-based space-filling curve. If the region is not a $2^k$ by $2^k$ square, then the region is broken up into one or more $2^k$ by $2^k$ squares. Any remaining sub-region is centered within a $2^k$ by $2^k$ square, the $2^k$ by $2^k$ square is numbered using a fractal-based space-filling curve, and then the sub-region is renumbered by assigning numbers based on the order of the original block numbers of the sub-region.

20 Claims, 18 Drawing Sheets

| Mapping Table 625 | | |
|---|---|---|
| VA | CBN | LA |
| 0x010002000 | 0 | D605:A02 |
| 0x010002010 | 1 | D610:A09 |
| 0x010002020 | 2 | D610:A10 |
| 0x010002030 | 3 | D605:A03 |
| 0x010002040 | 4 | D605:A04 |
| 0x010002050 | 5 | D605:A05 |
| 0x010002060 | 6 | D610:A12 |
| 0x010002070 | 7 | D610:A11 |
| 0x010002080 | 8 | D615:A54 |
| 0x010002090 | 9 | D615:A75 |
| 0x010002100 | 10 | D620:A98 |
| 0x010002110 | 11 | D620:A83 |
| 0x010002120 | 12 | D620:A19 |
| 0x010002130 | 13 | D615:A17 |
| 0x010002140 | 14 | D615:A02 |
| 0x010002150 | 15 | D620:A15 |

Device 605: A02 (0), A03 (3), A04 (4), A05 (5)

Device 610: A09 (1), A10 (2), A11 (7), A12 (6)

Device 615: A02 (14), A17 (13), A54 (8), A75 (9)

Device 620: A15 (15), A19 (12), A83 (11), A98 (10)

FIG. 6

| 0 | 3 | 4 | 5 | 58 | 59 | 60 | 63 |
|---|---|---|---|----|----|----|----|
| 1 | 2 | 7 | 6 | 57 | 56 | 61 | 62 |
| 14 | 13 | 8 | 9 | 54 | 55 | 50 | 49 |
| 15 | 12 | 11 | 10 | 53 | 52 | 51 | 48 |
| 16 | 17 | 30 | 31 | 32 | 33 | 46 | 47 |
| 19 | 18 | 29 | 28 | 35 | 34 | 45 | 44 |
| 20 | 23 | 24 | 27 | 36 | 39 | 40 | 43 |
| 21 | 22 | 25 | 26 | 37 | 38 | 41 | 42 |

```
//convert (x,y) to d
int xy2d (int n, int x, int y) {
    int rx, ry, s, d=0;
    for (s=n/2; s>0; s/=2) {
        rx = (x & s) > 0;
        ry = (y & s) > 0;
        d += s * s * ((3 * rx) ^ ry);
        rot(s, &x, &y, rx, ry);
    }
    return d;
}
```

810

```
//convert d to (x,y)
void d2xy(int n, int d, int *x, int *y) {
    int rx, ry, s, t=d;
    *x = *y = 0;
    for (s=1; s<n; s*=2) {
        rx = 1 & (t/2);
        ry = 1 & (t ^ rx);
        rot(s, x, y, rx, ry);
        *x += s * rx;
        *y += s * ry;
        t /= 4;
    }
}
```

815

```
//rotate/flip a quadrant appropriately
void rot(int n, int *x, int *y, int rx, int ry) {
    int t;
    if (ry == 0) {
        if (rx == 1) {
            *x = n-1 - *x;
            *y = n-1 - *y;
        }
        t = *x;
        *x = *y;
        *y = t;
    }
}
```

FIG. 8

| 10 | 11 | 12 | 15 |
|----|----|----|----|
| 9  | 8  | 13 | 14 |
| 6  | 7  | 2  | 1  |
| 5  | 4  | 3  | 0  |

| 0 X | 3 1 | 4 2 | 5 3 | 58 44 | 59 45 | 60 46 | 63 X |
|---|---|---|---|---|---|---|---|
| 1 X | 2 0 | 7 5 | 6 4 | 57 43 | 56 42 | 61 47 | 62 X |
| 14 X | 13 11 | 8 6 | 9 7 | 54 40 | 55 41 | 50 36 | 49 X |
| 15 X | 12 10 | 11 9 | 10 8 | 53 39 | 52 38 | 51 37 | 48 X |
| 16 X | 17 12 | 30 22 | 31 23 | 32 24 | 33 25 | 46 35 | 47 X |
| 19 X | 18 13 | 29 21 | 28 20 | 35 27 | 34 26 | 45 34 | 44 X |
| 20 X | 23 15 | 24 16 | 27 19 | 36 28 | 39 31 | 40 32 | 43 X |
| 21 X | 22 14 | 25 17 | 26 18 | 37 29 | 38 30 | 41 33 | 42 X |

| 1 | 2 | 3 | 44 | 45 | 46 |
|---|---|---|----|----|----|
| 0 | 5 | 4 | 43 | 42 | 47 |
| 11 | 6 | 7 | 40 | 41 | 36 |
| 10 | 9 | 8 | 39 | 38 | 37 |
| 12 | 22 | 23 | 24 | 25 | 35 |
| 13 | 21 | 20 | 27 | 26 | 34 |
| 15 | 16 | 19 | 28 | 31 | 32 |
| 14 | 17 | 18 | 29 | 30 | 33 |

FRACTAL LAYOUT OF DATA BLOCKS ACROSS MULTIPLE DEVICES

BACKGROUND

1. Field of the Invention

This invention relates to storage systems and, more particularly, to mapping data blocks across multiple storage devices.

2. Description of the Related Art

Storage systems store and retrieve data in response to input/output (I/O) requests received from the clients. Storage systems often include physical volumes, which may be actual physical storage devices, such as hard disks, solid-state devices, storage devices using another storage technology, or partitions of a storage device. Software applications, such as logical volume managers or disk array managers, provide a means of allocating space within a storage system. Storage virtualization may be utilized within a storage system to provide an abstraction of logical storage from physical storage in order to access logical storage without end-users identifying physical storage.

To support storage virtualization, a volume manager performs I/O redirection by translating incoming I/O requests using logical addresses from end-users into new requests using addresses associated with physical locations in the storage devices. Mapping tables may be utilized to perform the I/O redirection by mapping from block numbers in a logical address space to physical locations within the storage devices.

Referring now to FIG. 1, four storage devices 100A-D are shown. These storage devices may be part of a storage subsystem, and the storage subsystem may be utilized by any number of clients. Each storage device 100A-D includes a corresponding region 102A-D, respectively. Each region may be a logical address space that maps to a corresponding physical address space that may be utilized for storing data.

Turning now to FIG. 2, one prior art approach for mapping virtual block numbers to a plurality of storage devices is shown. Virtual block numbers are generated for the virtual blocks of regions 102A-D of storage devices 100A-D of FIG. 1. It is noted that "virtual block numbers" may be referred to as "block numbers" and "virtual blocks" may be referred to as "blocks" herein. In the example shown, consecutive blocks are mapped to the same region, such that blocks 0-3 are mapped to region 102A, blocks 4-7 are mapped to region 102B, blocks 8-11 are mapped to region 102C, and blocks 12-15 are mapped to region 102D. This mapping scheme assigns blocks such that consecutive blocks are stored on the same storage device. This may ensure good sequential read performance, but limits the amount of parallelism used until the I/O request size is very large. For example, a request for six blocks would likely involve only two storage devices, though it could involve a third in some cases (e.g., blocks 3-8).

Turning now to FIG. 3, another prior art approach for mapping block numbers to a plurality of storage devices is shown. In this approach, block numbers are generated such that consecutive blocks are stored on different storage devices. I/O requests that involve multiple sequential blocks are guaranteed to use different devices, increasing the amount of parallel accesses to storage. However, in some cases, there may be too much parallelism in the resultant I/O requests. For example, any request of four or more blocks would involve all four storage devices. As a result, too many separate I/O requests may be generated.

I/O system designers often want the number of storage devices used for an I/O request to increase as the size of the request increases, but not as fast as would be the case using the layout shown in FIG. 3. In view of the above, improved systems and methods for mapping block numbers to storage devices are desired.

SUMMARY OF EMBODIMENTS

Various embodiments of a computer system and methods for mapping block numbers to a storage system are contemplated. Block numbers are generated for blocks in a region that spans multiple storage devices such that smaller I/O requests require access to a few storage devices while larger requests require access to progressively more storage devices. A fractal layout may be utilized to layout blocks within the region and generate the corresponding block numbers. In one embodiment, the fractal layout may be based on a Hilbert space-filling curve. In other embodiments, other space-filling curves (e.g., a Morton curve) may be utilized.

In some embodiments, the region corresponding to the storage system may be a $2^k$ by $2^k$ square region, wherein k is a positive integer greater than one. In other embodiments, the region may not be a $2^k$ by $2^k$ square region. In these embodiments, the region may be broken up into smaller $2^k$ by $2^k$ square regions. Each of the smaller $2^k$ by $2^k$ square regions may be numbered using a fractal-based space-filling curve. Any remaining portion of the overall region that is not a $2^k$ by $2^k$ square region may be positioned within a $2^k$ by $2^k$ square region. In one embodiment, the remaining portion may be centered within the $2^k$ by $2^k$ square region. The blocks of the $2^k$ by $2^k$ square region may be numbered as usual using the fractal-based space-filling curve, and then the blocks within the leftover portion may be renumbered based on the original numbering scheme.

Each block of the leftover portion may have a initial number based on the fractal-based space-filling curve numbering of the entire $2^k$ by $2^k$ square region. In one embodiment, the blocks of the leftover portion may be renumbered based on these initial numbers. The block with the lowest initial number within the leftover portion may be renumbered to '0', the block with the next lowest initial number within the leftover portion may be renumbered to '1', and so on until the highest initial number within the leftover portion is renumbered to 'M−1', wherein 'M' is the number of blocks within the leftover portion.

These and other embodiments will become apparent upon consideration of the following description and accompanying drawings.

BRIEF DESCRIPTION OF THE DRAWINGS

FIG. 6 is a generalized block diagram of one embodiment of a mapping table and corresponding storage.

FIG. 7 is a generalized block diagram of one embodiment of an 8×8 block layout.

FIG. 8 is a generalized block diagram of one embodiment of an algorithm for generating a space-filling curve.

FIG. 9 illustrates one embodiment of the numbering of blocks within a 4×4 square region.

FIG. 14 is a generalized block diagram illustrating one embodiment of a leftmost column and a rightmost column being discarded.

FIG. 15 is a generalized block diagram illustrating one embodiment of a region with renumbered blocks.

Figure 1:
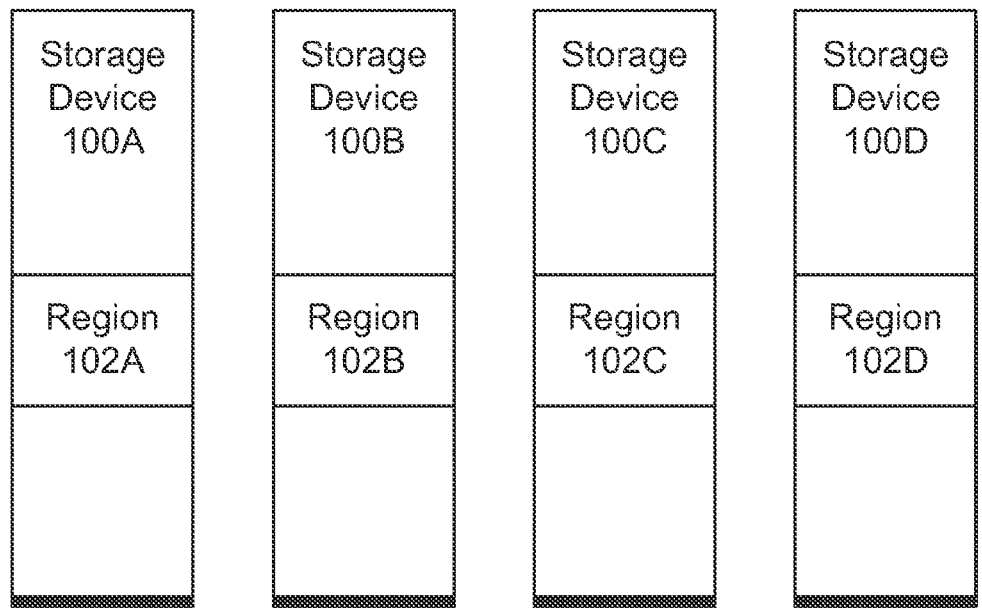
FIG. 1 is a generalized block diagram illustrating one embodiment of four storage devices.
Figure 2:
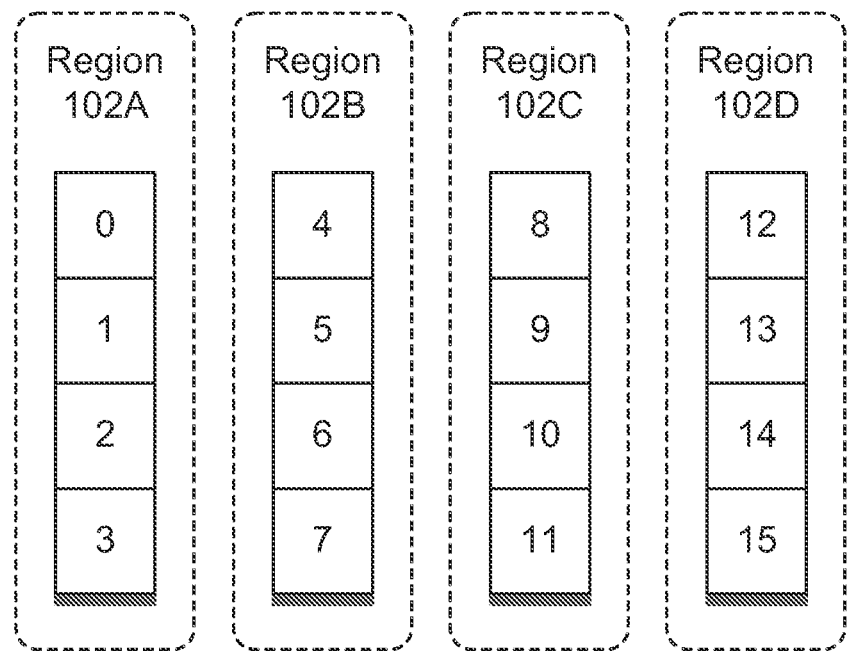
FIG. 2 is a generalized block diagram of one embodiment of a prior art approach for mapping block numbers to a plurality of storage devices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A computing system comprising a data storage controller . . . ." Such a claim does not foreclose the computing system from including additional components (e.g., a network interface, one or more processors).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 4:
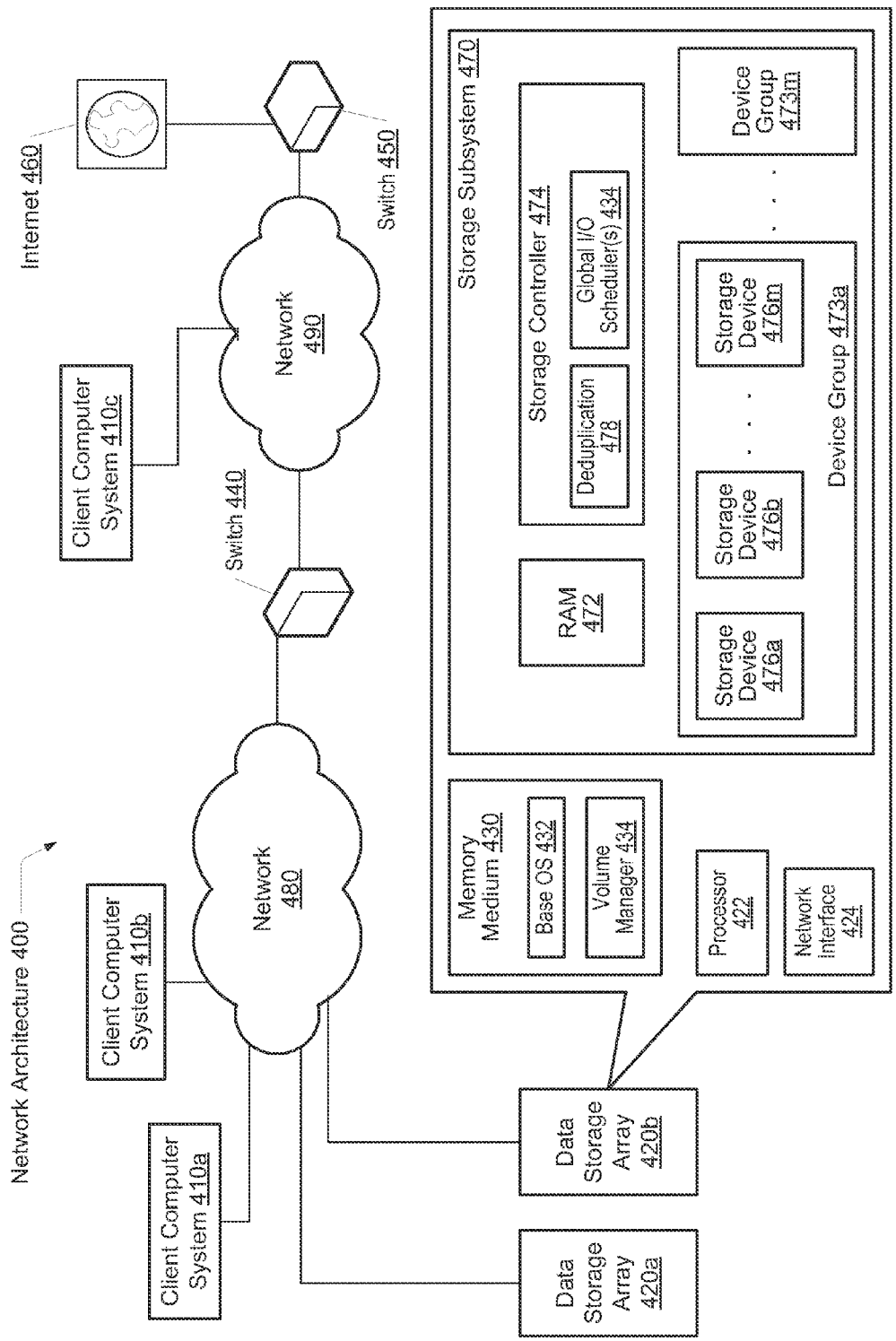
FIG. 4 is a generalized block diagram of one embodiment of a network architecture.

Turning now to FIG. 4, a generalized block diagram of one embodiment of a network architecture 400 is shown. As described further below, one embodiment of network architecture 400 includes client computer systems 410a-410b interconnected to one another through a network 480 and to data storage arrays 420a-420b. Network 480 may be coupled to a second network 490 through a switch 440. Client computer system 410c is coupled to client computer systems 410a-410b and data storage arrays 420a-420b via network 490. In addition, network 490 may be coupled to the Internet 460 or other networks through switch 450.

It is noted that in alternative embodiments, the number and type of client computers and servers, switches, networks, data storage arrays, and data storage devices is not limited to those shown in FIG. 4. At various times one or more clients may operate offline. In addition, during operation, individual client computer connection types may change as users connect, disconnect, and reconnect to network architecture 400. Furthermore, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 4 is provided shortly. First, an overview of some of the features provided by the data storage arrays 420a-420b is described.

In the network architecture 400, each of the data storage arrays 420a-420b may be used for the sharing of data among different servers and computers, such as client computer systems 410a-410c. In addition, the data storage arrays 420a-420b may be used for disk mirroring, backup and restore, archival and retrieval of archived data, and data migration from one storage device to another. In an alternate embodiment, one or more client computer systems 410a-410c may be linked to one another through fast local area networks (LANs) in order to form a cluster. Such clients may share a storage resource, such as a cluster shared volume residing within one of data storage arrays 420a-420b.

Each of the data storage arrays 420a-420b includes a storage subsystem 470 for data storage. Storage subsystem 470 may comprise a plurality of storage devices 476a-476m. Storage devices 476a-476m may provide data storage services to client computer systems 410a-410c. Each of the storage devices 476a-476m may use a particular technology and mechanism for performing data storage. The type of technology and mechanism used within each of the storage devices 476a-476m may at least in part be used to determine the algorithms used for controlling and scheduling read and write operations to and from each of the storage devices 476a-476m. For example, the algorithms may locate particular physical locations corresponding to the operations. In addition, the algorithms may perform input/output (I/O) redirection for the operations, removal of duplicate data in the storage subsystem 470, and support one or more mapping tables used for address redirection and deduplication.

The logic used in the above algorithms may be included in one or more of a base operating system (OS) 432, a volume manager 434, within a storage subsystem controller 474, control logic within each of the storage devices 476a-476m, or otherwise. Additionally, the logic, algorithms, and control mechanisms described herein may comprise hardware and/or software.

Each of the storage devices 476a-476m may be configured to receive read and write requests and comprises a plurality of data storage locations, each data storage location being addressable as rows and columns in an array. In one embodiment, the data storage locations within the storage devices 476a-476m may be arranged into logical, redundant storage containers or redundant arrays of independent drives (RAID) for data storage and protection.

In some embodiments, each of the storage devices 476a-476m may utilize technology for data storage that is different from a conventional hard disk drive (HDD). For example, one or more of the storage devices 476a-476m may include or be further coupled to storage consisting of solid-state memory to store persistent data. In other embodiments, one or more of the storage devices 476a-476m may include or be further coupled to storage using other technologies such as spin torque transfer technique, magnetoresistive random access memory (MRAM) technique, shingled disks, memristors, phase change memory, or other storage technologies. These different storage techniques and technologies may lead to differing I/O characteristics between storage devices.

In one embodiment, the included solid-state memory comprises solid-state drive (SSD) technology. A Solid-State Disk (SSD) may also be referred to as a Solid-State Drive. Without moving parts or mechanical delays, an SSD may have a lower read access time and latency than a HDD. However, the write performance of SSDs is generally slower than the read performance and may be significantly impacted by the availability of free, programmable blocks within the SSD.

Storage array efficiency may be improved by creating a storage virtualization layer between user storage and physical locations within storage devices 476a-476m. In one embodiment, a virtual layer of a volume manager is placed in a device-driver stack of an operating system (OS), rather than within storage devices or in a network. Many storage arrays perform storage virtualization at a coarse-grained level to allow storing of virtual-to-physical mapping tables entirely in memory. However, such storage arrays may not be able to integrate features such as data compression, deduplication and copy-on-modify operations. Many file systems support fine-grained virtual-to-physical mapping tables, but they do not support large storage arrays, such as device groups 473a-473m. Rather, a volume manager or a disk array manager may be used to support device groups 473a-473m.

In one embodiment, one or more mapping tables may be stored in the storage devices 476a-476m, rather than memory, such as RAM 472, memory medium 430 or a cache within processor 422. The storage devices 476a-476m may be SSDs utilizing Flash memory. The low read access and latency times for SSDs may allow a small number of dependent read operations to occur while servicing a storage access request from a client computer. The dependent read operations may be used to access one or more indexes, one or more mapping tables, and user data during the servicing of the storage access request.

In one example, I/O redirection may be performed by the dependent read operations. In another example, inline deduplication may be performed by the dependent read operations. In yet another example, bulk array tasks, such as a large copy, move, or zeroing operation, may be performed entirely within a mapping table rather than accessing storage locations holding user data. Such a direct map manipulation may greatly reduce I/O traffic and data movement within the storage devices 476a-476m. The combined time for both servicing the storage access request and performing the dependent read operations from SSDs may be less than servicing a storage access request from a spinning HDD.

In addition, the information within a mapping table may be compressed. A particular compression algorithm may be chosen to allow identification of individual components, such as a key within a record among multiple records. Therefore, a search for a given key among multiple compressed records may occur. In various embodiments the search for a given key may be performed without decompressing each tuple by comparing the compressed representation of the key against the compressed information stored in the relevant fields of the tuple. If a match is found, only the matching record may be decompressed. Compressing the tuples within records of a mapping table may further enable fine-grained level mapping. This fine-grained level mapping may allow direct map manipulation as an alternative to common bulk array tasks. Further details concerning efficient storage virtualization will be discussed below.

Again, as shown, network architecture 400 includes client computer systems 410a-410c interconnected through networks 480 and 490 to one another and to data storage arrays 420a-420b. Networks 480 and 490 may include a variety of techniques including wireless connection, direct local area network (LAN) connections, wide area network (WAN) connections such as the Internet, a router, storage area network, Ethernet, and others. Networks 480 and 490 may comprise one or more LANs that may also be wireless. Networks 480 and 490 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 480 and

490. Switch 440 may utilize a protocol associated with both networks 480 and 490. The network 490 may interface with a set of communications protocols used for the Internet 460 such as the Transmission Control Protocol (TCP) and the Internet Protocol (IP), or TCP/IP. Switch 450 may be a TCP/IP switch.

Client computer systems 410a-410c are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 410a-410c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 410a-410c may include a base operating system (OS) stored within the memory hierarchy. The base OS may be representative of any of a variety of operating systems, such as, for example, MS-DOS®, MS-WINDOWS®, OS/2®, UNIX®, Linux®, Solaris®, AIX®, DART, or otherwise. As such, the base OS may be operable to provide various services to the end-user and provide a software framework operable to support the execution of various programs. Additionally, each of the client computer systems 410a-410c may include a hypervisor used to support virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources and access to logical storage entities (e.g., LUNs) built upon the storage devices 476a-476m within each of the data storage arrays 420a-420b.

Each of the data storage arrays 420a-420b may be used for the sharing of data among different servers, such as the client computer systems 410a-410c. Each of the data storage arrays 420a-420b includes a storage subsystem 470 for data storage. Storage subsystem 470 may comprise a plurality of storage devices 476a-476m. Each of these storage devices 476a-476m may be an SSD. A controller 474 may comprise logic for handling received read/write requests. A random-access memory (RAM) 472 may be used to batch operations, such as received write requests. In various embodiments, when batching write operations (or other operations) non-volatile storage (e.g., NVRAM) may be used.

The base OS 432, the volume manager 434 (or disk array manager 434), any OS drivers (not shown) and other software stored in memory medium 430 may provide functionality providing access to files and the management of these functionalities. The base OS 432 may be a storage operating system such as NetApp Data ONTAP® or otherwise. The base OS 432 and the OS drivers may comprise program instructions stored on the memory medium 430 and executable by processor 422 to perform one or more memory access operations in storage subsystem 470 that correspond to received requests. The system shown in FIG. 4 may generally include one or more file servers and/or block servers.

Each of the data storage arrays 420a-420b may use a network interface 424 to connect to network 480. Similar to client computer systems 410a-410c, in one embodiment, the functionality of network interface 424 may be included on a network adapter card. The functionality of network interface 424 may be implemented using both hardware and software. Both a random-access memory (RAM) and a read-only memory (ROM) may be included on a network card implementation of network interface 424. One or more application specific integrated circuits (ASICs) may be used to provide the functionality of network interface 424.

In addition to the above, each of the storage controllers 474 within the data storage arrays 420a-420b may support storage array functions such as snapshots, replication and high availability. In addition, each of the storage controllers 474 may support a virtual machine environment that comprises a plurality of volumes with each volume including a plurality of snapshots. In one example, a storage controller 474 may support hundreds of thousands of volumes, wherein each volume includes thousands of snapshots. In one embodiment, a volume may be mapped in fixed-size sectors, such as a 4-kilobyte (KB) page within storage devices 476a-476m. In another embodiment, a volume may be mapped in variable-size sectors such as for write requests. A volume ID, a snapshot ID, and a sector number may be used to identify a given volume.

One or more mapping tables may be used to map I/O requests from each of the client computer systems 410a-410c to physical locations in storage devices 476a-476m. A first mapping table may include a mapping of a virtual address space of a given client to a logical address space represented by block numbers. A second table may map the block numbers to the physical address space of storage devices 476a-476m. In some embodiments, the information in the first and second mapping tables may be combined into a single mapping table. A "physical" pointer value may be read from the second mapping table during a lookup operation associated with a given virtual address and a corresponding block number. This physical pointer value may then be used to locate a physical location within the storage devices 476a-476m. It is noted the physical pointer value may be used to access another mapping table within a given storage device of the storage devices 476a-476m. Consequently, one or more levels of indirection may exist between the physical pointer value and a target storage location.

In another embodiment, the mapping table(s) may comprise information used to deduplicate data, such as deduplication table related information. The information stored in the deduplication table may include mappings between one or more calculated hash values for a given data component and a physical pointer to a physical location in one of the storage devices 476a-476m holding the given data component. In addition, a length of the given data component and status information for a corresponding entry may be stored in the deduplication table.

Figure 5:
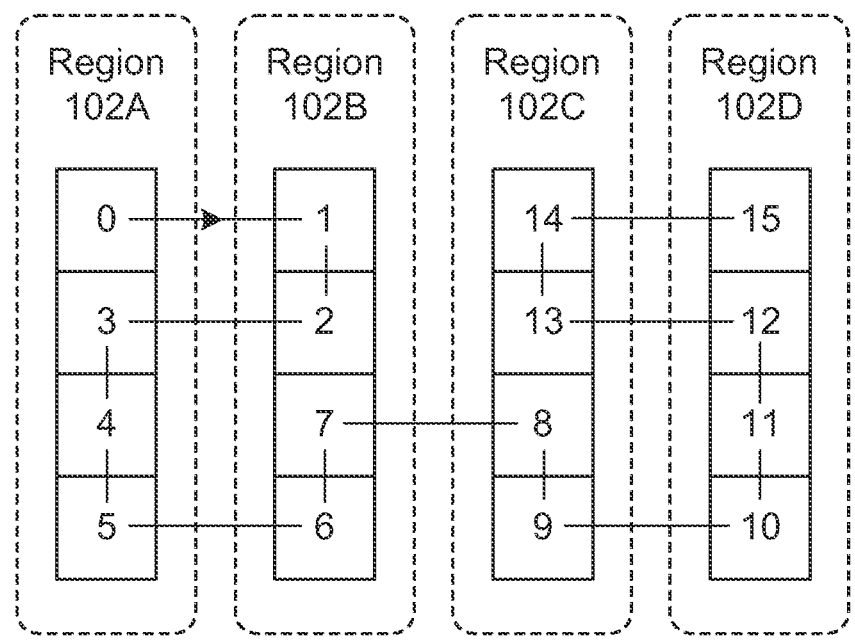
FIG. 5 is a generalized block diagram illustrating one embodiment of a fractal-based mapping approach.

Referring now to FIG. 5, a block diagram of one embodiment of a fractal-based layout of blocks is shown. As used herein, the term "fractal" may be defined as an object in which the parts or individual components of the whole are self-similar. In other words, a "fractal" is a self-similar geometric shape produced by an equation that undergoes repeated iterative steps or recursion. The block numbering shown in FIG. 5 is generated using a fractal-based pattern to number the blocks within the regions 102A-D of the storage devices. In some embodiments, the regions 102A-D may be referred to as a single region.

As shown in FIG. 5, the numbering of blocks is based on a Hilbert space-filling curve. Generally speaking, a "space-filling curve" is a curve whose range contains the entire two-dimensional address space region. In other words, a "space-filling curve" may be defined as a function that maps a two-dimensional space into a one-dimensional space. A space-filling curve passes through every block in the two-dimensional grid of regions 102A-D so that each block is only visited once. There are many different types of space-filling curves, one of which is the Hilbert space-filling curve.

The Hilbert space-filling curve is a continuous fractal space-filling curve first described by German mathematician David Hilbert in 1891. The Hilbert space-filling curve defines an algorithm which may be utilized for mapping a particular block number to a location within the region. One advantage of the Hilbert space-filling curve is that it does a fairly adequate job of preserving locality. The Hilbert space-filling curve may take a path that traces through all the points in a two-dimensional square grid in such a way that each step in the path moves between neighbors in the grid.

In other embodiments, other space-filling curves may be utilized. For example, in another embodiment, a Morton space-filling curve may be utilized to generate block numbers for a storage system. Depending on the embodiment, the space-filling curve providing the best clustering with respect to the specific storage system may be utilized. The blocks, which correspond to a logical address space, may be numbered sequentially starting at the beginning of the space-filling curve and incrementing at each step of the curve until reaching the end of the curve within the overall region.

Figure 3:
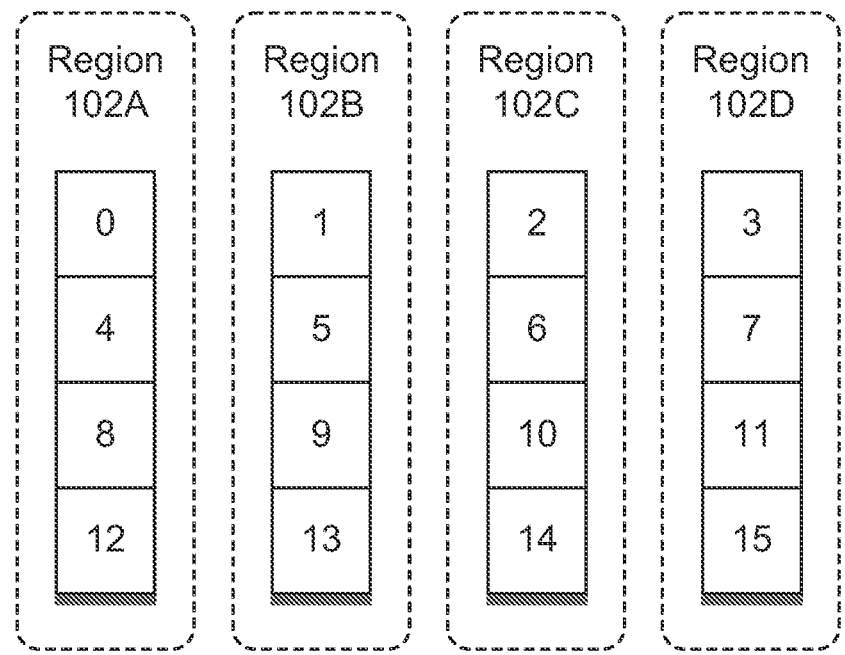
FIG. 3 is a generalized block diagram of one embodiment of another prior art approach for mapping block numbers to a plurality of storage devices.

Blocks may be labeled using the Hilbert space-filling curve such that consecutive blocks are laid out across multiple storage devices in a fractal pattern. The mapping shown in FIG. 5 allows for the number of storage devices used for an I/O request to increase as the size of the I/O request increases, but not as fast as would be the case using the layout shown in FIG. 3. Requests of three consecutive blocks require accesses to at a maximum of two different devices, while requests of four consecutive blocks usually require accesses of two different devices, though occasionally they may require a third device (e.g., blocks 5-8). Requests of five blocks require accesses of at most three different drives. Generally speaking, the number of storage devices accessed by an I/O request does not scale linearly as the number of blocks per I/O request increases. Instead, the number of storage devices accessed by an I/O request of 'N' blocks will on average be the square root of N, as opposed to 'N' storage devices for a layout based on the parallel approach of FIG. 3.

In one embodiment, the layout shown in FIG. 5 may be generated during a configuration phase of the storage subsystem. This layout may be stored in a mapping table or other file. In another embodiment, the layout shown in FIG. 5 may be generated in real-time as blocks are utilized to process I/O requests to the storage subsystem. In such an embodiment, a particular block number may be mapped to a location on-the-fly based on a fractal pattern, such as the Hilbert space-filling curve. The most recently used block number that was utilized by a previous I/O request may be stored in a table or file. When a new I/O request is received, the algorithm for the fractal-based space-filling curve may start from this most recently used block number and generate new block numbers for the number of blocks that are required for the new I/O request.

In a further embodiment, instead of using the next unused block number, the algorithm may jump to a further point on the fractal-based space-filling curve. In such an embodiment, to perform a jump to a further point on the curve, a formula may be utilized for calculating the (x, y) location of a destination block in the region given the location along the one dimensional path (i.e. index). Formulas for calculating these locations are well known to those skilled in the art. For example, if the last used block number is two, and a new I/O request is received by the storage subsystem, then block numbers may be generated starting at a block number higher than three. For example, new block numbers may be generated starting with a block number of six. In this way, the algorithm may jump to a future point on the space-filling curve, skipping over one or more blocks that are in the path of the space-filling curve. This is for illustrative purposes only, and any other subsequent block number may be utilized for the I/O request. At some future point, the block numbers that were skipped over during this request may be utilized by an I/O request.

Turning now to FIG. 6, a block diagram of one embodiment of a mapping table 625 and corresponding storage devices is shown. Table 625 shows mappings of virtual addresses (VA) to curve block numbers (CBN) and logical addresses (LA). The blocks of devices 605-620 may be numbered from 0 to 15 using a Hilbert space-filling curve as described above in regard to FIG. 5. In addition, each block includes a logical address associated with the location of the block within its respective storage device. For example, block '0' is located at address '02' within device 605, block '1' is located at address '09' within device 610, and so on. The addresses shown in FIG. 6 are for illustrative purposes only, and in other embodiments, other types and representations of addresses may be utilized. For example, in another embodiment, the logical address shown in mapping table 625 may only contain a pointer to a given device, and the device may determine the address for a specific curve block number according to its own mapping mechanisms and tables.

Mapping table 625 may be stored in any of various locations (e.g., cache, RAM, memory medium) within a storage subsystem, such as storage subsystem 470 (of FIG. 4). Mapping table 625 may be utilized to perform address translations from a virtual address space to the physical address space of storage devices 605-620. For example, if an I/O request were received for virtual address (VA) 0x010002000, then this virtual address may correspond to curve block number (CBN) 0, which is mapped to address '02' of storage device 605. In one embodiment, the entries and addresses of mapping table 625 may be generated during a configuration phase of the storage subsystem. In another embodiment, the entries and addresses of mapping table 625 may be generated in real-time. In other embodiments, some of the entries and addresses may be generated on setup and some of the entries and addresses may be generated in real-time.

It is noted that the mapping table 625 shown in FIG. 6 is only one possible embodiment of a mapping table which may be used to perform address translations from virtual to the logical address space of storage devices 605-620. In other embodiments, mapping table 625 may be organized in a different manner with other numbers of columns and with other types of information. Furthermore, the storage devices 605-620 may also have internal mapping mechanisms. For example, the logical address shown in mapping table 625 may be mapped by the storage device to a physical location within the device. Over time, this internal mapping between logical address and physical location may change.

Turning now to FIG. 7, one embodiment of an 8×8 region is shown. The region shown in FIG. 7 is an 8×8 square, and the columns in this layout represent storage devices, or sections within storage devices, and the rows represent blocks within each storage device (or section). The region may also be referred to as a two-dimensional grid, wherein the first dimension is a number of blocks and the second dimension is the number of storage devices. In the embodiment shown in FIG. 4, there are eight storage devices (or regions) and eight blocks per storage device. A Hilbert space-filling curve was utilized to generate the layout of the square in FIG. 4. In other embodiments, other space-filling curves (e.g., Morton) may be utilized. In some embodiments, the columns in the region may actually correspond to a portion of a storage device.

The Hilbert space-filling curve may be utilized with any $2^k$ by $2^k$ square region, wherein k is a positive integer greater than one. For example, 16×16 squares, 32×32 squares, 64×64 squares, and so on, may utilize a block numbering scheme based on the Hilbert space-filling curve. In other embodiments, other types of space-filling curves (e.g., Morton) may be utilized to generate block numbers for the blocks of the region.

Referring now to FIG. 8, one example of an algorithm for generating a space-filling curve is shown. In the example shown, the code in block 805 may perform a mapping from a two-dimensional grid to a one-dimensional curve. The code in block 810 may perform a mapping from a one-dimensional curve to a two-dimensional grid. The code assumes the two-dimensional grid is a square divided into n-by-n cells, for an 'n' equal to a power of two, the square uses integer coordinates, with (0,0) in the lower-left corner, with (n−1, n−1) in the upper-right corner, and a distance 'd' that starts at 0 in the lower-left corner and goes to $(n^2-1)$ in the lower-right corner. The rotate function, which is utilized by the code in blocks 805 and 810, is shown in block 815. However, other ways of expressing a space-filling curve algorithm are possible and are contemplated. In one embodiment, the code shown in blocks 805-815 may be utilized for striping data across storage devices.

Figure 9:
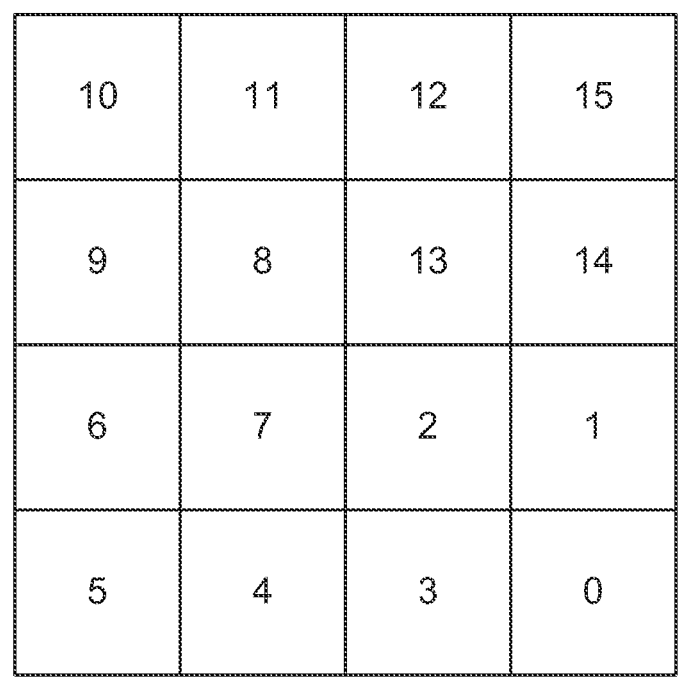

Referring now to FIG. 9, a block diagram of the numbering of blocks within a 4×4 square region is shown. The 4×4 square region in FIG. 9 is numbered based on the Hilbert space-filling curve algorithm and region 825 (of FIG. 8). The path taken by the curve begins in the bottom right corner of the 4×4 square region, and so this block is numbered '0'. The block number is incremented for each subsequent block that is traversed by the path, such that the block above the '0' block is numbered '1', the block to the left of the '1' block is numbered '2', and so on. The block in the top right corner of the 4×4 square region, which is the last block traversed by the Hilbert space-filling curve of FIG. 8, is numbered '15'. The 4×4 square region of FIG. 9 may be flipped in the horizontal direction and rotated clockwise by 90 degrees to match the block numbering layout of the 4×4 square region shown in FIG. 5. In various embodiments, the block numbering layout generated by a Hilbert space-filling curve may be flipped in various directions and/or rotated by multiples of 90 degrees.

Figure 10:
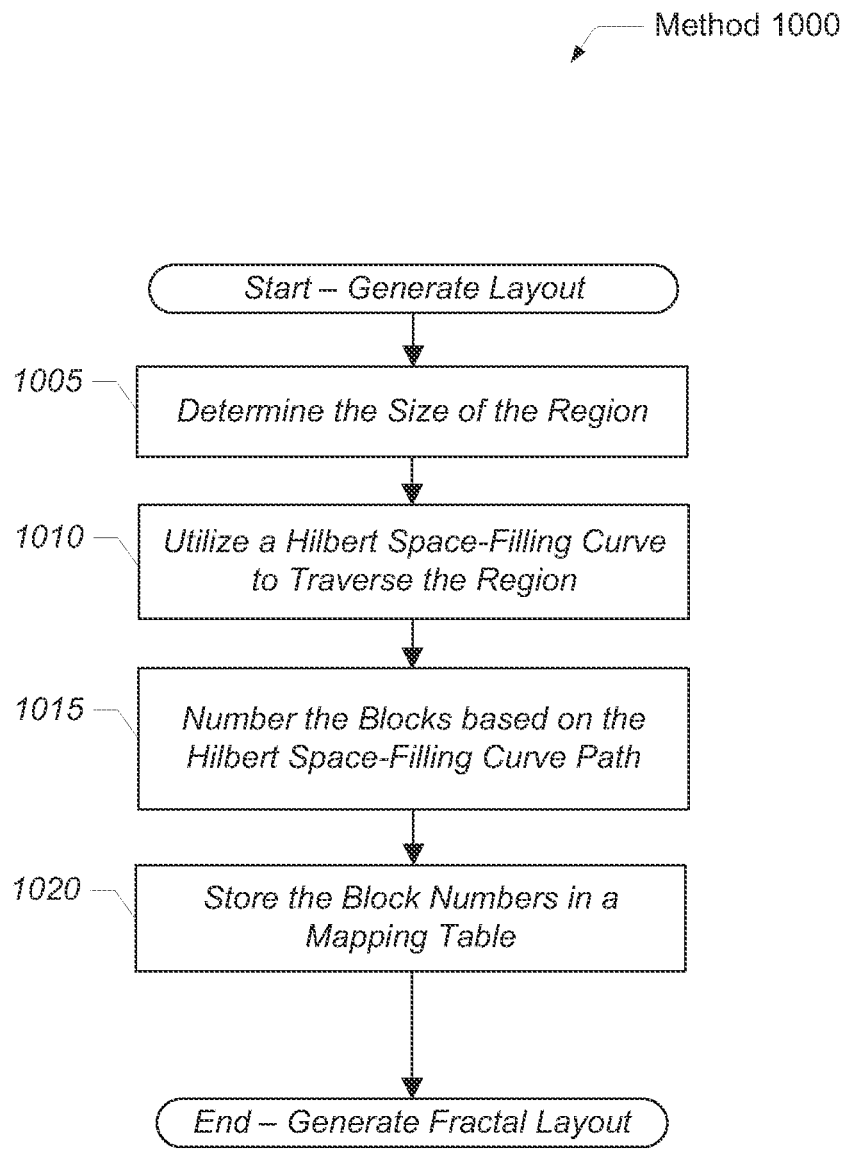
FIG. 10 is a generalized flow diagram of one embodiment of a method for generating a fractal layout of block numbers for a region utilizing a Hilbert space-filling curve algorithm.

Turning now to FIG. 10, one embodiment of a method for generating a layout of block numbers for a region utilizing a space-filling curve algorithm is shown. In one embodiment, a data storage controller, such as storage controller 474 (of FIG. 4), may be configured to operate in accordance with method 1000. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In the embodiment shown, method 1000 begins by determining the size of the region which is used to for storage in a storage subsystem (block 1005). For the purposes of this discussion, it will be assumed that the region is a $2^k$ by $2^k$ square region, wherein k is a positive integer greater than one. For other types of regions, such as non-square regions, other methods may be utilized which will be discussed further below. After block 1005, an algorithm may be utilized to generate a space-filling curve (e.g., a Hilbert curve) for traversing the plurality of blocks of the region (block 1010). In one embodiment, the algorithm shown in FIG. 8 may be utilized to generate the Hilbert space-filling curve. In one embodiment, the algorithm may be executed by a processor (e.g., processor 422) within a data storage array (e.g., data storage array 420b). In other embodiments, the algorithm may be executed by any of various other types of hardware and/or software. Next, the blocks may be numbered based on the path taken by the Hilbert space-filling curve through the region (block 1015).

After block 1015, the block numbers may be stored in a mapping table (block 1020). In one embodiment, the mapping table may be stored in a storage subsystem, such as storage subsystem 470 (of FIG. 4) of data storage array 420b. The mapping table may be utilized for fulfilling I/O requests received from a client. For example, a client may generate an I/O request to store a file in array 420b. If the size of the file is such that it corresponds to four storage blocks, the first four blocks of the region may be utilized (0-3) for storing the four portions, and the mapping of the blocks to the specific storage devices 476a-m may be retrieved from the mapping table to determine where to store the four portions of the file. Subsequent files may be stored in the remaining blocks, starting with block 4, which is the next unused block. This example is for illustrative purposes only, and other files may be broken up into any number of portions, depending on the file size and the size of the portions and blocks. In one embodiment, the block-size may be the same for all blocks within the storage subsystem. In other embodiments, the block-size may vary within the storage subsystem and/or within a single storage device.

Figure 11:
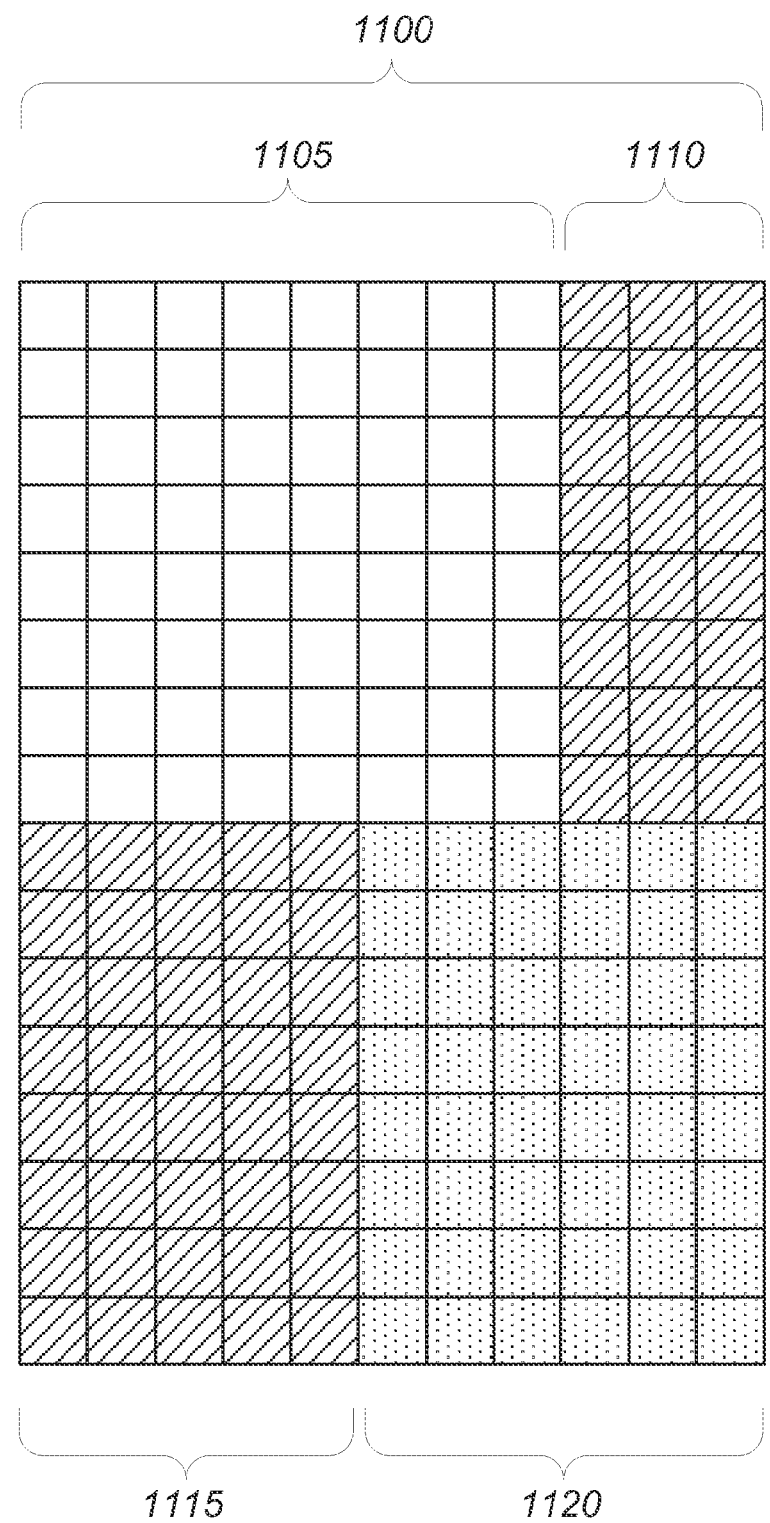
FIG. 11 is a generalized block diagram of one embodiment of a rectangular region.

Referring now to FIG. 11, a block diagram of a rectangular region is shown. The region shown in FIG. 11 is a rectangular-shaped 11×16 region. The 11 columns of the region correspond to 11 storage devices in the physical address space. The 16 rows correspond to the 16 blocks that may be stored in each storage device. The region 1100 is not a square region with a side length of $2^k$, and therefore one or more alternate schemes for numbering the blocks may be utilized. In one embodiment, the overall region 1100 may be split up into smaller regions that form squares with a side length of $2^k$. It is noted that in some embodiments, the value of 'k' may vary for the smaller regions that are created by splitting up the overall region 1100. As shown in FIG. 11, the overall region 1100 may be partitioned into multiple regions, including the region 1205, which is a square of length eight ($2^k$, with k=3). The overall region 1100 may also be partitioned into regions 1110 and 1115, and regions 1110 and 1115 may be combined to form a square of length eight.

Generally speaking, any overall region that is not a $2^k$ by $2^k$ square may be broken up into one or more smaller sized sub-regions. The overall region may be divided into two or more sub-regions, with at least one of the sub-regions chosen such that it is the largest $2^k$ by $2^k$ square that fits in the overall region. Then, other sub-regions from the overall region may be combined, if possible, to make one or more other $2^k$ by $2^k$ squares. These $2^k$ by $2^k$ square sub-regions, either original $2^k$ by $2^k$ square sub-regions or a combination of two or more sub-regions that forms a $2^k$ by $2^k$ square sub-region, may have their blocks numbered according to a fractal-based space-filling curve. Any leftover sub-region that cannot be combined to form a $2^k$ by $2^k$ square sub-region may be numbered according to various methods depending on the embodiment, one of which is described in further detail below.

The techniques described above may be used for regions of various sizes. For example, in another embodiment, a region may span 16 drives, and 64 blocks may be stored on each drive, forming a 64×16 region. The 64×16 region may be broken up into four 16×16 regions, and then each 16×16 region may be mapped using a fractal-based space-filling curve. In other embodiments, other sizes of regions may be partitioned. The technique used for partitioning involves first breaking up the region into the largest square of $2^k$ side that fits into the region. If more than one of these squares fits into the overall region, then the region may be split up into as many squares that fit.

Also, if two or more pieces of the region may be combined to form a square, then the region may be partitioned into these two or more pieces. For some regions, there may be a non-square shaped leftover region that is unable to be combined with any other piece to form a square. For this leftover non-square sub-region, the sub-region may be centered within a $2^k$ by $2^k$ square, and then the square may be numbered using the fractal-based space-filling curve. In various embodiments, the $2^k$ by $2^k$ square may be a different size than the previously used $2^k$ by $2^k$ squares. After the square has been numbered, the rectangular leftover region, which fills only a portion of the square, may be renumbered. First, the leftover region may be "removed" from the overall square and then renumbered. The renumbering is accomplished via the following steps: First, look for the smallest number in the leftover region. This smallest number will be renumbered as '0'. It is possible this smallest number was already '0'. Then, the next smallest number in the leftover region will be identified, and this next smallest number will be renumbered as '1'. Again, it is possible the number of this block was already '1'. These steps may continue, wherein the next higher original number is identified, and then this block may be renumbered with the next sequential integer in the renumbering scheme. For example, if the leftover region contains 20 blocks, then these blocks may be renumbered from 0 to 19 using the steps described above. Prior to the renumbering scheme, if this leftover region were in an overall 8×8 square (containing 64 blocks), then the blocks may have been numbered from anywhere between 0 to 63.

Figure 12:
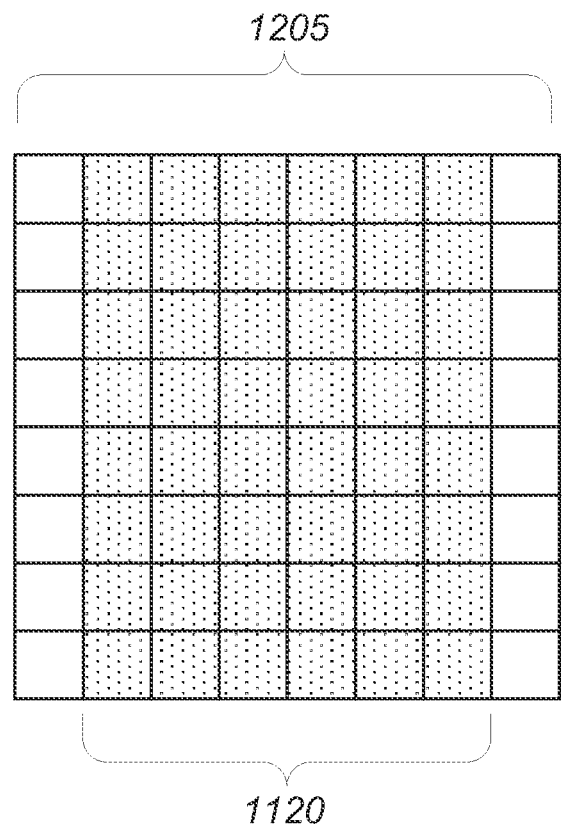
FIG. 12 is a generalized block diagram illustrating one embodiment of a layout of a leftover sub-region.
Figure 13:
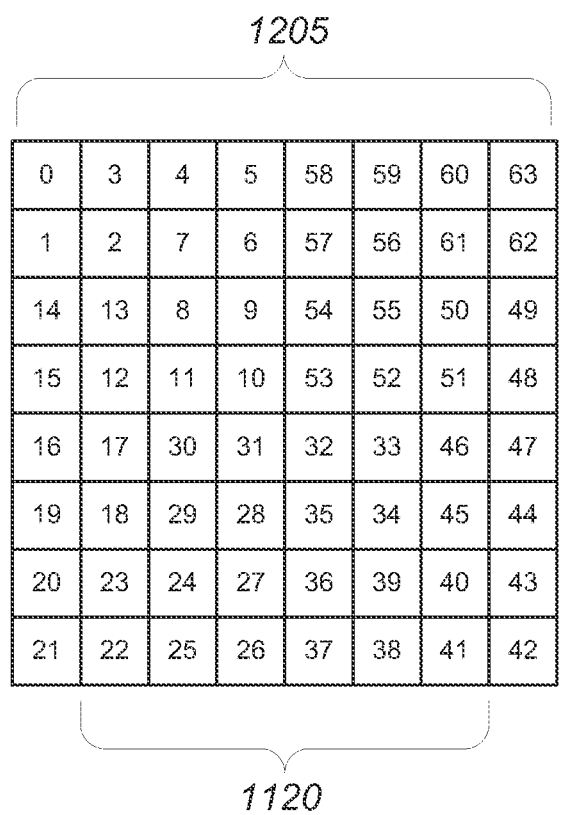
FIG. 13 is a generalized block diagram illustrating one embodiment of a block numbering scheme based on a Hilbert space-filling curve.

Turning now to FIG. 12, a block diagram of one embodiment of a layout of a leftover sub-region is shown. Sub-region 1120 is the leftover rectangular region from overall region 1100 of FIG. 11. To generate block numbers for the blocks of sub-region 1120, sub-region 1120 may be centered within 8×8 square region 1205. Then, region 1205 may be numbered using a Hilbert space-filling curve, as is shown in FIG. 13. As is shown in FIG. 13, region 1205 is numbered in an identical fashion to the 8×8 region shown in FIG. 6. In other embodiments, other types of space-filling curves may be utilized to generate a fractal layout of block numbers.

After region 1205 is mapped using the Hilbert space-filling curve, the leftmost and rightmost columns of region 1205 may be discarded, as is shown in FIG. 14. The leftmost and rightmost columns of region 1205 include an 'X' in the bottom of each of the squares indicating that these squares are not mapped to blocks on devices. Then, the blocks of region 1120 may be renumbered according to the scheme previously described. The numbers in the top of each block are the original numbers used in the mapping of the entire region 1205. The numbers in the bottom of each block are the final block numbers for the blocks of region 1120, as is shown in FIG. 15. The block numbers shown in FIG. 15 may be utilized for mapping blocks to the physical address space of the underlying storage devices. In one embodiment, the block numbers shown in FIG. 15 may be generated prior to performing the actual mapping of blocks to the storage device and stored for later use rather than being generated on-the-fly on an as-needed basis.

The techniques disclosed in FIGS. 11-15 for laying out block numbers for a rectangular region may be applied to other sizes of rectangular regions. In general, a rectangle may be of size A by B with M total blocks, wherein A, B, and M are integers. The rectangle may be partitioned into one or more square regions, wherein each square region has a side length equal to $2^k$, wherein k is a positive integer greater than one. If the rectangle is partitioned into more than one square region, the value of k may vary for the different square regions. The block numbers for the square region(s) may be numbered by utilizing a space-filling curve (e.g., Hilbert space-filling curve). Any leftover region from the original rectangle may be positioned within a square of side length equal to $2^k$ and the square may be numbered according to a space-filling curve. Then the rectangle portion of the square, corresponding to the leftover region, may be renumbered according to an ascending sequential order of the block numbers generated for the square.

Figure 16:
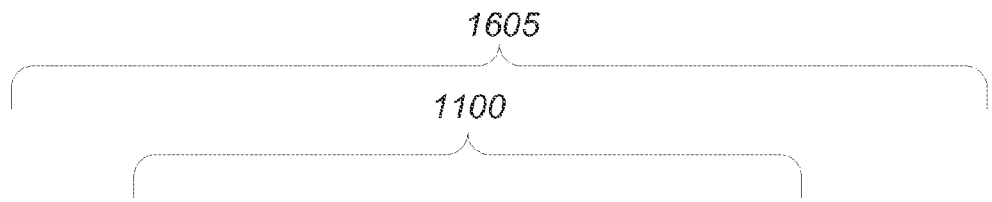
FIG. 16 is a generalized block diagram illustrating another embodiment of a rectangular region centered within a square region.
Figure 17:
FIG. 17 is a generalized block diagram illustrating one embodiment of a rectangular region with renumbered blocks.

Turning now to FIG. 16, another embodiment of a rectangular region centered within a square region is shown. Region 1100 is shown in FIG. 16, which is the same 11×16 region shown in FIG. 11. An alternate scheme for laying out block numbers in a fractal pattern for a rectangular region is shown in FIG. 16. In one embodiment, region 1100 may be centered within the 16×16 square 1605. In other embodiments, region 1100 may be placed at any location within square 1605. There are two extra columns on the leftside of region 1100 and three extra columns on the rightside of region 1100 which may be attached to region 1100 to make up the overall 16×16 square 1605. In other embodiments, a region may have more columns than rows (i.e., more storage devices than blocks). In such an embodiment, the region may be centered within a $2^k$ by $2^k$ square such that there are empty rows on top and/or on bottom of the region within the square. The example shown in FIG. 16 is illustrative only, and various other sizes of regions may be centered within a $2^k$ by $2^k$ square in a similar manner In one embodiment, block numbers may be generated for region 1605 using the Hilbert space-filling curve. Other types of space-filling curves may be utilized in other embodiments. Then, the extra two columns on the left-side and the extra three columns on the right-side of region 1605 may be discarded, and region 1100 may be renumbered using the scheme illustrated in FIGS. 14 and 15. The renumbering scheme for region 1100 is shown in FIG. 17.

Figure 18:
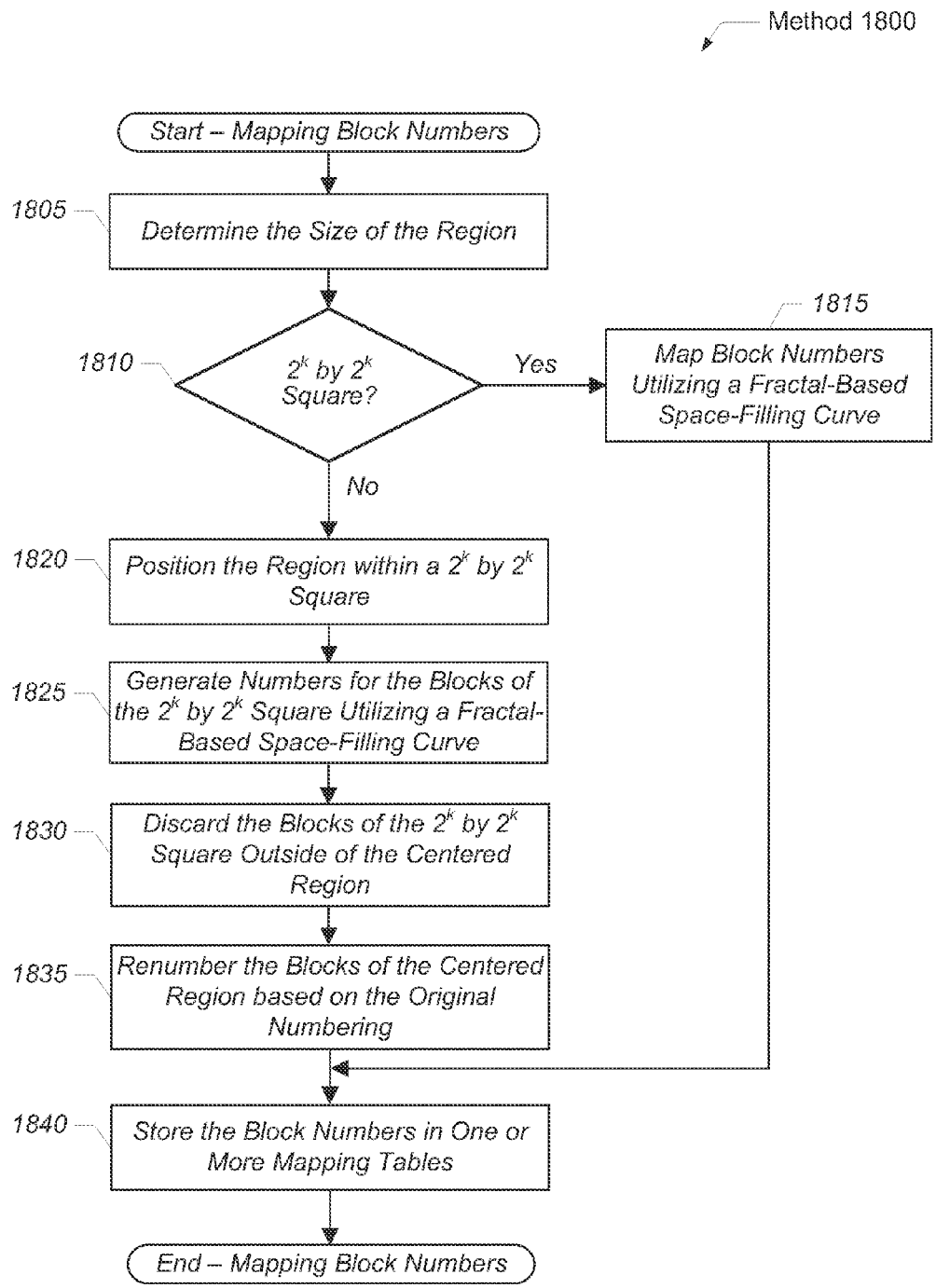
FIG. 18 is a generalized flow diagram illustrating one embodiment of a method for mapping block numbers within a region.

Turning now to FIG. 18, one embodiment of a method for mapping block numbers within a region is shown. In one embodiment, a data storage controller, such as storage controller 474 (of FIG. 4), may generally operate in accordance with method 1800. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 1800 may begin by determining the size of the region which is used to represent the physical address space of a storage subsystem (block 1805). The region may include any number of storage devices and any number of blocks per storage device. In one embodiment, the region may be represented by a two-dimensional grid, with a first dimension corresponding to the number of blocks and a second dimension corresponding to the number of storage devices. Generally speaking, I/O requests may access the storage subsystem on a block-by-block basis, and so therefore, two or more storage devices of the storage subsystem may be partitioned into blocks which may be used to process the I/O requests.

If the region is a $2^k$ by $2^k$ square (conditional block 1810), then the block numbers within the region may be mapped utilizing a fractal-based space-filling curve (block 1815). In one embodiment, the fractal-based space-filling curve may be a Hilbert space-filling curve. In other embodiments, other space-filling curves may be utilized.

If the region is not a $2^k$ by $2^k$ square (conditional block 1810), then the region may be positioned within a $2^k$ by $2^k$ square (block 1820). The size of the $2^k$ by $2^k$ square may be chosen such that the square is large enough to accommodate the region. In one embodiment, the region may be centered within the $2^k$ by $2^k$ square. In other embodiments, the region may be placed at any location within the $2^k$ by $2^k$ square. Next, numbers may be generated for the blocks of the $2^k$ by $2^k$ square utilizing a fractal-based space-filling curve (block 1825). Then, the blocks outside of the centered region may be discarded (block 1830). In other words, the blocks that fall outside of the original region may be removed from consideration during the subsequent renumbering process. Next, the blocks of the centered region may be renumbered from 0 to M−1, wherein M is the number of blocks in the centered region (block 1835). The renumbering may be based on the original numbering of the $2^k$ by $2^k$ square. The block numbers may be stored in one or more mapping tables for use in processing I/O requests directed to the storage subsystem (block 1840).

In various embodiments, one or more mapping tables may be used for I/O redirection or translation, deduplication of duplicate copies of user data, volume snapshot mappings, and so forth within a storage subsystem. In one embodiment, the mapping tables may be stored in the storage devices 476a-476m (of FIG. 4). Furthermore, copies of portions or all of a given mapping table may be stored in RAM 472, in buffers within controller 474, in memory medium 430, and in one or more caches within or coupled to processor 422.

The mapping tables may also include data fields including data such as a pointer used to identify or locate data components stored in storage subsystem 470. It is noted that in various embodiments, the storage subsystem may include storage devices (e.g., SSDs) which have internal mapping mechanisms. In such embodiments, the pointer may not be an actual physical address per se. Rather, the pointer may be a logical address which the storage device maps to a physical location within the device. Over time, this internal mapping between logical address and physical location may change.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a plurality of storage devices; and
   a data storage controller, wherein the data storage controller is configured to map virtual block numbers to physical locations in a region using a fractal pattern, and wherein the region spans two or more storage devices of the plurality of storage devices.

2. The computing system as recited in claim 1, wherein the region is represented by a two-dimensional grid, wherein a first dimension is measured in blocks, and wherein a second dimension is measured in storage devices.

3. The computing system as recited in claim 1, wherein a space-filling curve is utilized to generate the block numbers in the fractal pattern.

4. The computing system as recited in claim 3, wherein the space-filling curve is a Hilbert space-filling curve.

5. The computing system as recited in claim 4, wherein the region is a square with a side length equal to $2^k$, where k is a positive integer greater than one.

6. The computing system as recited in claim 4, wherein the region is a rectangle of size A by B with M blocks, wherein A, B, and M are integers greater than zero, and wherein the data storage controller is further configured to:
   center the region within a square of side length equal to $2^k$, wherein k is a positive integer greater than one, wherein the square includes N blocks, wherein N is an integer greater than zero, and wherein at least one of A or B is less than $2^k$;
   generate a first block number for each of the N blocks of the square utilizing the Hilbert space-filling curve, wherein the first block numbers are numbered from 0 to N−1;
   discard blocks outside of the centered region; and
   renumber each of the M blocks of the region with a second block number, wherein the second block numbers are numbered from 0 to M−1 according to an ascending sequential order of the first block numbers of the M blocks.

7. The computing system as recited in claim 6, wherein the data storage controller is further configured to discard the first block numbers subsequent to renumbering the M blocks of the region.

8. The computing system as recited in claim 6, wherein the data storage controller is further configured to generate and store a layout of the second block numbers prior to the layout being utilizing for accessing the physical locations in the region.

9. The computing system as recited in claim 4, wherein the region is a rectangle of size A by B with M blocks, wherein A, B, and M are integers greater than zero, and wherein the data storage controller is further configured to:
   partition the region into one or more square regions, wherein each square region has a side length equal to $2^k$, wherein k is a positive integer greater than one, and wherein k may vary for the one or more smaller square regions; and
   generate block numbers for each of the one or more smaller square regions utilizing the Hilbert space-filling curve.

10. The computing system as recited in claim 9, wherein a leftover region remains after partitioning the region into one or more square regions, wherein the leftover region is a rectangle of size C by D with P blocks, wherein C, D, and P are integers greater than zero, and wherein the data storage controller is further configured to:
   center the leftover region within a square of side length equal to $2^j$, wherein j is a positive integer greater than one, wherein the square includes N blocks, wherein N is an integer greater than zero, and wherein at least one of C or D is less than $2^j$;
   generate a first block number for each of the N blocks of the square utilizing the Hilbert space-filling curve, wherein the first block numbers are numbered from 0 to N−1;
   discard blocks outside of the centered region; and
   renumber each of the P blocks of the leftover region with a second block number, wherein the second block numbers are numbered from 0 to P−1 according to an ascending sequential order of the first block numbers of the P blocks.

11. A method for use in a computing system including a plurality of storage devices, the method comprising mapping virtual block numbers to physical locations in a region using a fractal pattern, wherein the region spans two or more storage devices of the plurality of storage devices.

12. The method as recited in claim 11, wherein the region is represented by a two-dimensional grid, wherein a first dimension is measured in blocks, and wherein a second dimension is measured in storage devices.

13. The method as recited in claim 11, wherein a space-filling curve is utilized to generate the block numbers in the fractal pattern.

14. The method as recited in claim 13, wherein the space-filling curve is a Hilbert space-filling curve.

15. The method as recited in claim 14, wherein the region is a square with a side length equal to $2^k$, and where k is a positive integer greater than one.

16. The method as recited in claim 14, wherein the region is a rectangle of size A by B with M blocks, where A, B, and M are integers greater than zero, the method further comprising:
   centering the region within a square of side length equal to $2^k$, wherein k is a positive integer greater than one, wherein the square includes N blocks, where N is an integer greater than zero and a least one of A or B is less than $2^k$;
   generating a first block number for each of the N blocks of the square utilizing the Hilbert space-filling curve, wherein the first block numbers are numbered from 0 to N−1;
   discarding blocks outside of the centered region; and
   renumbering each of the M blocks of the region with a second block number, wherein the second block numbers are numbered from 0 to M−1 according to an ascending sequential order of the first block numbers of the M blocks.

17. The method as recited in claim 16, the method further comprising discarding the first block numbers subsequent to renumbering each of the M blocks of the region.

18. A non-transitory computer readable storage medium comprising program instructions, wherein said program instructions are executable to map virtual block numbers to physical locations in a region of a storage system including a plurality of storage devices using a fractal pattern, wherein the region spans two or more of the plurality of storage devices.

19. The non-transitory computer readable storage medium as recited in claim 18, wherein the region is represented by a two-dimensional grid, wherein a first dimension is measured in blocks, and wherein a second dimension is measured in storage devices.

20. The non-transitory computer readable storage medium as recited in claim 19, wherein a space-filling curve is utilized to generate the block numbers in the fractal pattern.

* * * * *

UNITED STATES PATENT AND TRADEMARK OFFICE
CERTIFICATE OF CORRECTION

PATENT NO.        : 8,719,540 B1
APPLICATION NO.   : 13/421336
DATED             : May 6, 2014
INVENTOR(S)       : Miller et al.

Page 1 of 1

It is certified that error appears in the above-identified patent and that said Letters Patent is hereby corrected as shown below:

In the Claims:

Column 17, Claim 8, Line 2, please delete "being utilizing" and substitute -- being utilized --

Signed and Sealed this
Tenth Day of February, 2015

Michelle K. Lee
*Deputy Director of the United States Patent and Trademark Office*